United States Patent
Naderan et al.

(10) Patent No.: US 11,126,838 B2
(45) Date of Patent: Sep. 21, 2021

(54) APPARATUS AND METHOD FOR MATCHING LINE ITEM TEXTUAL ENTRIES WITH INDIVIDUAL IMAGE OBJECTS FROM A FILE WITH MULTIPLE IMAGE OBJECTS

(71) Applicant: AppZen, Inc., San Jose, CA (US)

(72) Inventors: Edris Naderan, San Jose, CA (US); Thomas James White, San Jose, CA (US); Deepti Chafekar, San Jose, CA (US); Debashish Panigrahi, San Jose, CA (US); Kunal Verma, San Jose, CA (US); Snigdha Purohit, San Jose, CA (US)

(73) Assignee: APPZEN, INC., San Jose, CA (US)

( * ) Notice: Subject to any disclaimer, the term of this patent is extended or adjusted under 35 U.S.C. 154(b) by 50 days.

(21) Appl. No.: 16/785,427

(22) Filed: Feb. 7, 2020

(65) Prior Publication Data
US 2021/0248365 A1    Aug. 12, 2021

(51) Int. Cl.
*G06K 9/00*   (2006.01)
*G06K 9/62*   (2006.01)

(52) U.S. Cl.
CPC ..... *G06K 9/00463* (2013.01); *G06K 9/00456* (2013.01); *G06K 9/00469* (2013.01); *G06K 9/6256* (2013.01); *G06K 2209/01* (2013.01)

(58) Field of Classification Search
CPC .......... G06K 9/00456; G06K 9/00463; G06K 9/00469; G06K 9/6256; G06K 2209/01; G06Q 40/12

USPC ............................................ 382/177; 705/30
See application file for complete search history.

(56) References Cited

U.S. PATENT DOCUMENTS

| | | | | |
|---|---|---|---|---|
| 10,210,579 | B1 * | 2/2019 | Neveu ................ | G06Q 10/1093 |
| 10,332,109 | B2 * | 6/2019 | Ghatage ............. | G06Q 20/3563 |
| 2020/0320292 | A1 * | 10/2020 | Chawda ............. | G06K 9/00483 |
| 2021/0004949 | A1 * | 1/2021 | Broyda .................... | G06T 7/74 |

* cited by examiner

Primary Examiner — Daniel G Mariam
(74) Attorney, Agent, or Firm — Cooley LLP

(57) ABSTRACT

A computer implemented method includes receiving a document with line item textual entries and an attachment containing images of different objects characterizing different transactions. The images of the different objects are split into individual image objects. Attributes from the individual image objects are extracted. The line item textual entries are matched with the individual image objects to form matched image objects. The matched image objects include ambiguous matches with multiple individual image objects assigned to a single line item textual entry or a single individual image object assigned to multiple line item textual entries. An assignment model is applied to resolve the ambiguous matches. The assignment model defines priority constraints, assigns pairs of line item textual entries and individual image objects that meet highest priority constraints, removes highest priority constraints when ambiguous matches remain, and repeats these operations until no ambiguous matches remain. One-to-one matches of line item textual entries and individual image objects are returned.

11 Claims, 8 Drawing Sheets

APPARATUS AND METHOD FOR MATCHING LINE ITEM TEXTUAL ENTRIES WITH INDIVIDUAL IMAGE OBJECTS FROM A FILE WITH MULTIPLE IMAGE OBJECTS

FIELD OF THE INVENTION

This invention relates generally to digital object recognition. More particularly, this invention is directed toward techniques for matching line item textual entries with individual image objects from a file with multiple image objects.

BACKGROUND OF THE INVENTION

A digital image may contain different objects characterizing different transactions. Isolating the different objects into individual image objects is a technical challenge. Matching the individual image objects with textual entries that reference the different transactions is also a technical challenge.

Thus, there is a need for improved techniques for matching line item textual entries with individual image objects from a digital image with multiple image objects.

SUMMARY OF THE INVENTION

A computer implemented method includes receiving a document with line item textual entries and an attachment containing images of different objects characterizing different transactions. The images of the different objects are split into individual image objects. Attributes from the individual image objects are extracted. The line item textual entries are matched with the individual image objects to form matched image objects. The matched image objects include ambiguous matches with multiple individual image objects assigned to a single line item textual entry or a single individual image object assigned to multiple line item textual entries. An assignment model is applied to resolve the ambiguous matches. The assignment model defines priority constraints, assigns pairs of line item textual entries and individual image objects that meet highest priority constraints, removes highest priority constraints when ambiguous matches remain, and repeats these operations until no ambiguous matches remain. One-to-one matches of line item textual entries and individual image objects are returned.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
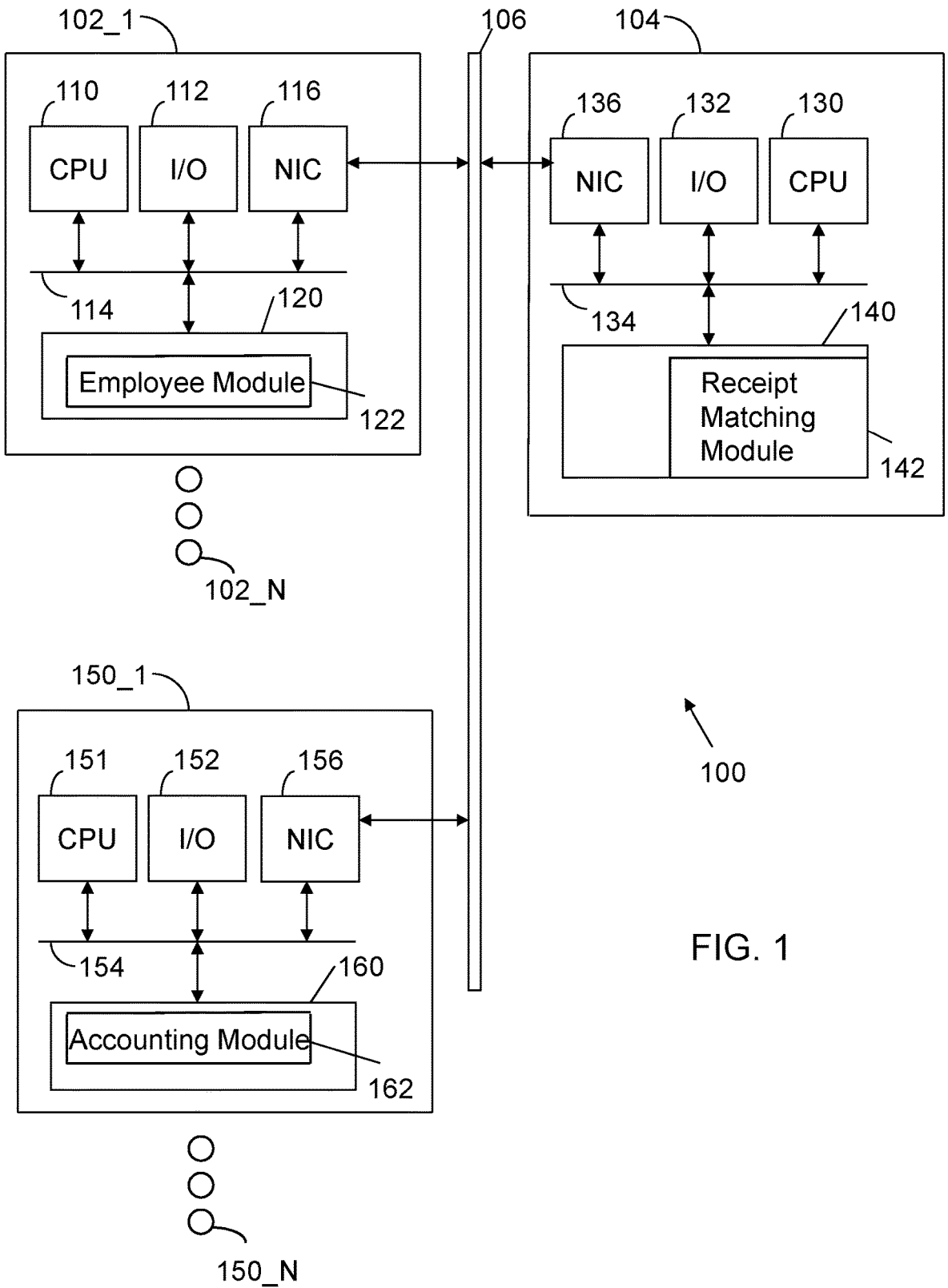
FIG. 1 illustrates a system configured in accordance with an embodiment of the invention.

FIG. 1 illustrates a system 100 configured in accordance with an embodiment of the invention. The system 100 includes a set of client devices 102_1 through 102_N that communicate with a server 104 via a network 106, which may be any combination of wired and wireless networks. Each client device includes a processor (e.g., central processing unit) 110 and input/output devices 112 connected via a bus 114. The input/output devices 112 may include a keyboard, mouse, touch display and the like. A network interface circuit 116 is also connected to the bus 114. The network interface circuit 116 provides connectivity to network 106. A memory 120 is also connected to the bus 114. The memory 120 stores instructions executed by processor 110. The memory 120 may store an employee module 122, which is an application that allows a user to specify line item textual entries and associate them with an attachment containing images of different objects characterizing different transactions. For example, the employee module 122 may provide an employee with a form with prompts to enter line item textual entries characterizing a transaction incurred by the employee on behalf of an employer (i.e., line item textual entries of an expense report). The form also prompts the employee to attach a file with an image of different objects characterizing different transactions (i.e., a file with images of different receipts).

Server 104 includes a processor 130, input/output devices 132, a bus 134 and a network interface circuit 136. A memory 140 is connected to the bus 134. The memory stores a receipt matching module 142 with instructions executed by processor 136 to implement the operations disclosed herein.

System 100 also includes employer machines 150_1 through 150_N. Each employer machine includes a processor 151, input/output devices 152, a bus 154 and a network interface circuit 156. A memory 160 is connected to bus 154. The memory stores an accounting module 162 with instructions executed by processor 151. The accounting module 162 implements standard accounting operations, including expense reimbursements for approved expense reports.

Server 104 may operate to process expense reports submitted by employees operating client devices 102_1 through 102_N. The results of processing the expense reports are communicated to employer machines 150_1 through 150_N. Alternately, the receipt matching module 142 may be implemented on employer machines 150_1 through 150_N.

Figure 2:
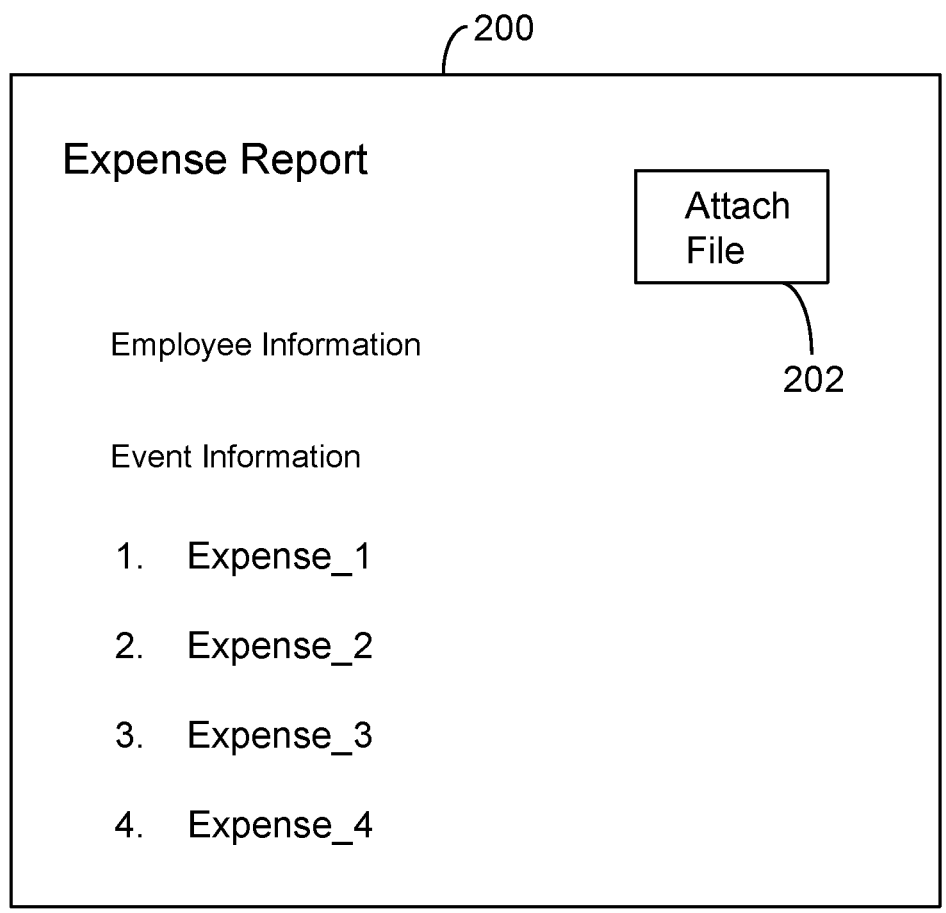
FIG. 2 illustrates an expense report that is processed in accordance with an embodiment of the invention.

FIG. 2 illustrates an example of a form 200 from an employee module 122 with prompts to specify employee information, event information and line item textual entries (i.e., Expense_1, Expense_2, Expense_3 and Expense_4). The form 200 also includes a prompt 202 to attach a file with images of receipts corresponding to the line item textual entries.

Figure 3:
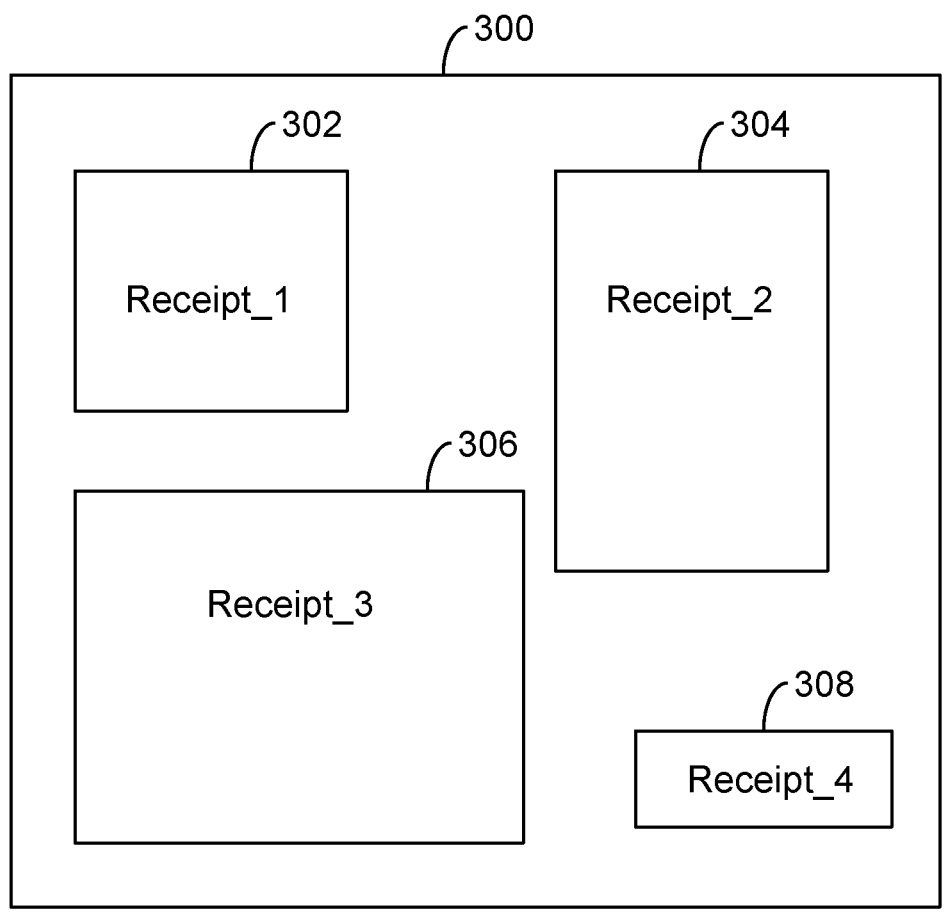
FIG. 3 illustrates a digital image with multiple image objects with different size attributes.

FIG. 3 illustrates a file 300 with digital images of four receipts 302, 304, 306 and 308 corresponding to the line item textual entries in FIG. 2 (i.e., Expense_1, Expense_2, Expense_3 and Expense_4). Note that the receipts have different spatial characteristics. Moreover, the text in the different receipts may be oriented in different directions (e.g., one receipt upside down, while another receipt is right side up, while another receipt is sideways).

Figure 4:
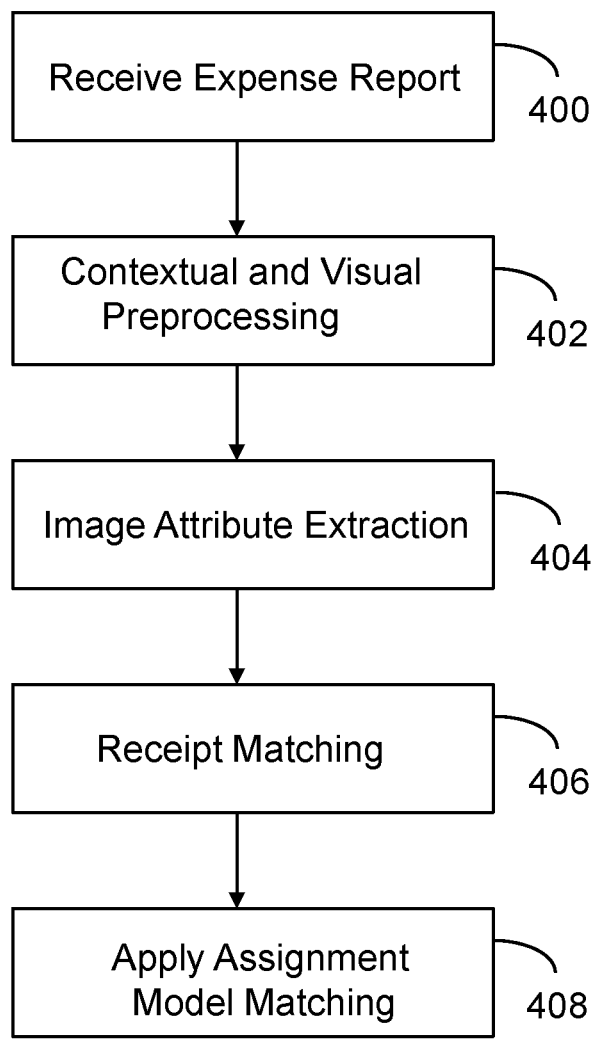
FIG. 4 illustrates processing operations performed in accordance with an embodiment of the invention.

FIG. 4 illustrates processing operations associated with the receipt matching module 142. An expense report is received 400. For example, the expense report of FIG. 2 may be received along with an attached file in the form of digital images of receipts, such as shown in FIG. 3.

Figure 5:
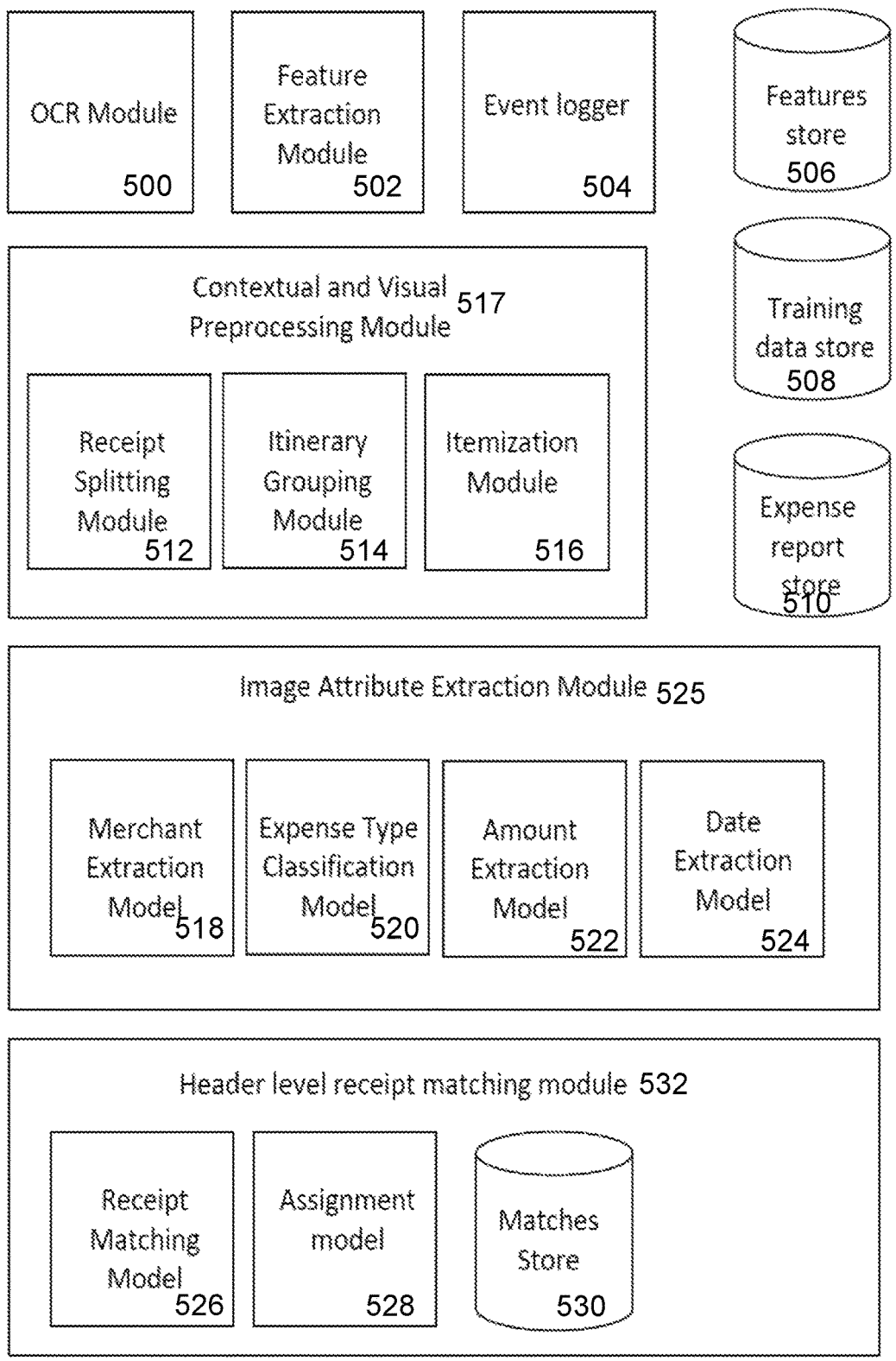
FIG. 5 illustrates processing modules associated with the disclosed receipt matching module.

Contextual and visual pre-processing is performed 402. FIG. 5 illustrates components associated with an embodiment of the receipt matching module 142. The contextual and visual pre-processing 402 may be implemented with a contextual and visual preprocessing module 517. The contextual and visual preprocessing module 517 interacts with an optical character recognition module 500, which implements standard optical character recognition operations. A feature extraction module 502 extracts meaningful attributes from text extracted by the OCR module 500. Those features are placed in a features store 506. The event logger 504 records actions taken during the receipt matching process. These actions may be studied for debugging purposes or to otherwise optimize processing. A training data store 508 is a collection of prior processed receipts associated with a single employer or multiple employers. An expense report store 510 is a collection of prior processed expense reports associated with a single employer or multiple employers.

The contextual and visual preprocessing module 517 includes a receipt splitting module 512. In one embodiment, the receipt splitting module 512 splits images of different objects into individual image objects utilizing a deep learning model trained on image objects with different characteristics, such as an image object with a striking contrast with a background surface, edges separating image objects, white space separation between objects and image objects with different orientations.

Consider the case of an image object with a striking contrast with a background surface, such as a white receipt on a brown table. The deep learning model explores the textures and color contrast. Multiple regions of the image are grouped together into sub-groups. Different sub-groups are combined to finally yield the individual image objects. In the case of edges separating image objects, the deep learning model explores the distribution of colors and pixels around the edge and differentiates between the color density of non-edge regions. Multiple regions of the image are grouped together into sub-groups. Different sub-groups are combined to yield the individual image objects. In the case of white space between objects, e.g., a white receipt on a white background, the deep learning model explores the distribution of colored pixel and contrasts it with the distribution of the white pixels. A receipt may be split when an image object to background pixel contrast exceeds a specified threshold. Multiple regions of the image are grouped together into sub-groups. Different sub-groups are combined to yield the individual image objects. In the case of different image originations and sizes, the deep learning model utilizes the previously described techniques to identify separation boundaries between the objects.

The contextual and visual preprocessing module 517 may also include an itinerary grouping module 514 that groups together individual image objects of a travel itinerary associated with a single trip (e.g., a taxi receipt, an airplane receipt, a hotel receipt, etc.).

The contextual and visual preprocessing module 517 may also include an itemization module 516. The itemization module 516 itemizes different charges on a single invoice, such as a hotel room charge, a hotel restaurant charge and a hotel parking charge.

Returning to FIG. 4, the next operation is image attribute extraction 404. This operation may be implemented with an image attribute extraction module 525. As shown in FIG. 5, the image attribute extraction module 525 may include a merchant extraction model 518, which extracts the name of a merchant or vendor associated with an individual image object. The merchant extraction model is a machine learning model or deep learning model that is trained utilizing data in training data store 508.

The image attribute extraction module 525 may also include an expense type classification model 520. An individual employer may specify a custom taxonomy of expense types. Alternately, a default taxonomy of expense types may be used. The expense type classification model 520 is a machine learning model or deep learning model that is trained utilizing data in the training data store 508. More particularly, it is trained to match individual expenses to an expense type taxonomy.

An amount extraction model 522 extracts a transaction amount. In one embodiment, the amount extraction model 522 is based on rules configured to search for a currency symbol followed by numerals. The amount extraction model 522 may also be a machine learning model or deep learning model trained utilizing data in training data store 508.

The image attribute extraction module 525 may also include a date extraction model 524. In one embodiment, the data extraction model 524 is based on rules configured to search for a month or a number format (e.g., XX/YY/ZZ). The date extraction model 524 may also be a machine learning model or deep learning model that is trained utilizing data in training data store 508.

Returning to FIG. 4, the next operation is receipt matching 406. As shown in FIG. 5, this may be implemented with a header level receipt matching module 532. "Header level" refers to a report level summary to which a file with bulk receipts is attached, such as shown in FIG. 2. The "header level" is followed by individual line entries, as shown in FIG. 2.

The header level receipt matching module 532 may include a receipt matching model 526. This model is trained to match line item textual entries with individual image objects to form matched image objects. The matched image objects include ambiguous matches with multiple individual image objects assigned to a single line item textual entry or a single individual image object assigned to multiple line item textual entries.

Figure 6:
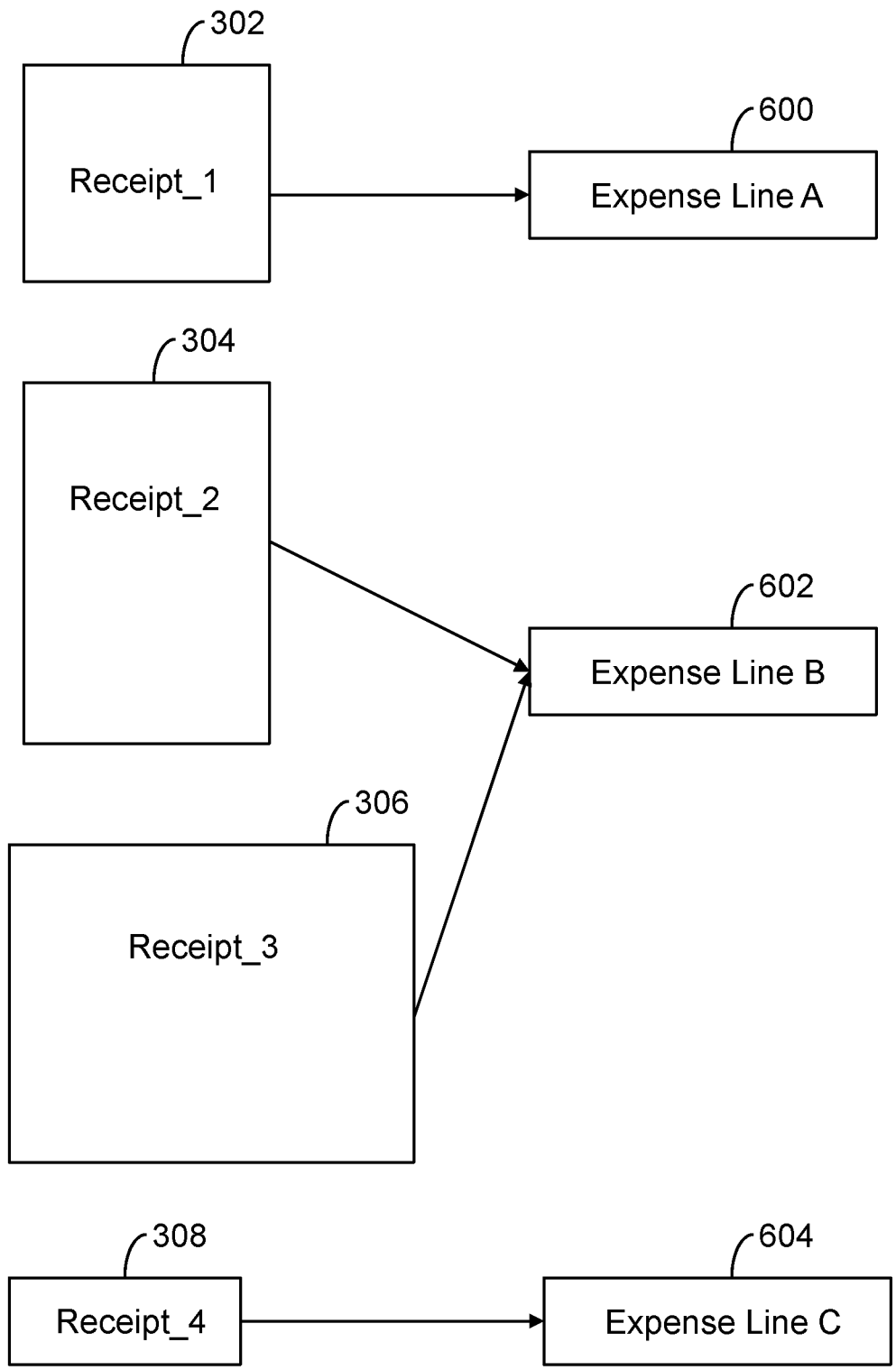
FIG. 6 illustrates many-to-one ambiguous matches resolved in accordance with embodiments of the invention.

FIG. 6 illustrates an example of output from the receipt matching model 526. A first receipt 302 is associated with a first expense line 600. Another receipt 308 is associated with another expense line 604. However, two receipts 304 and 306 are associated with a single expense line 602.

Figure 7:
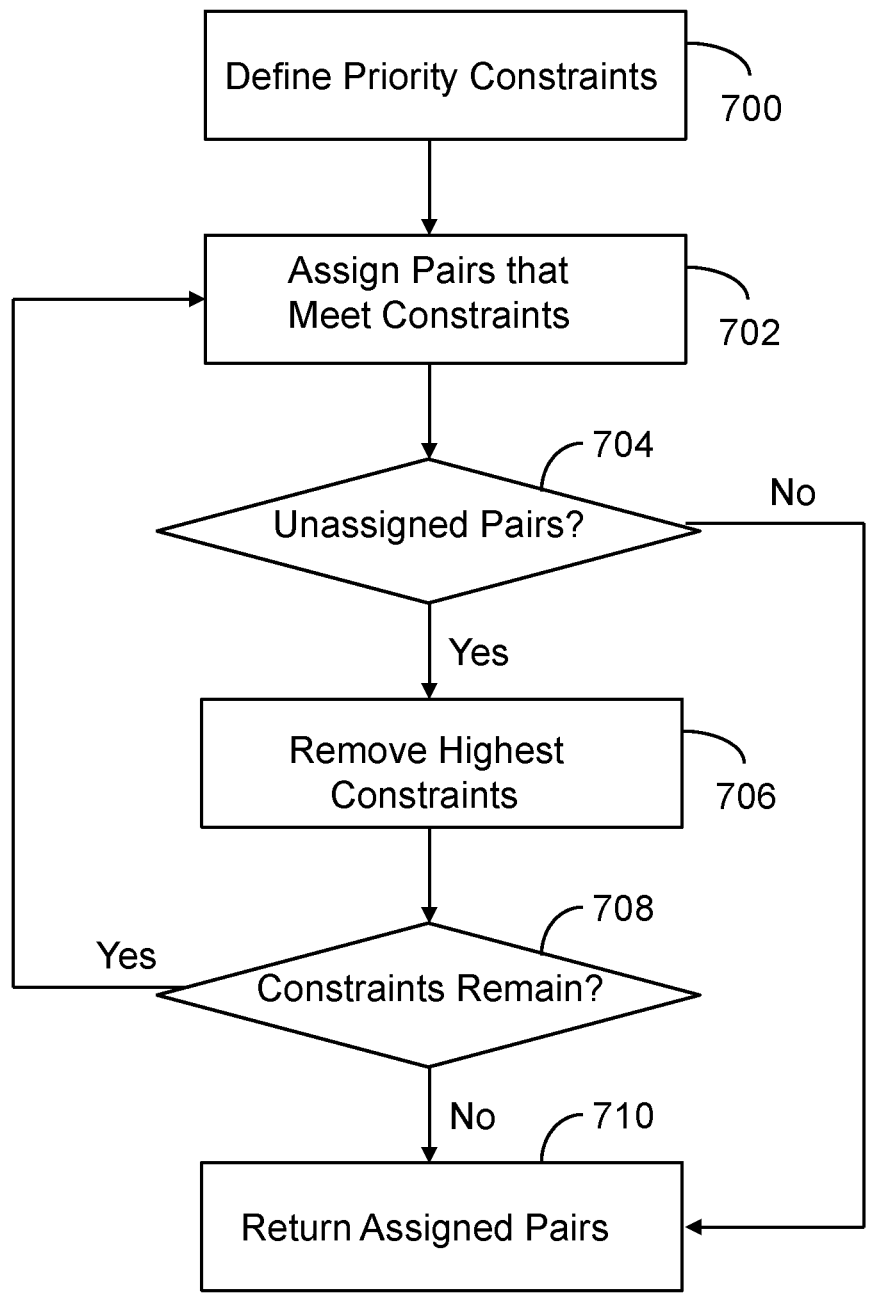
FIG. 7 illustrates assignment module matching performed in accordance with an embodiment of the invention.

The ambiguous matches of this type are resolved with the assignment model 528. FIG. 7 illustrates processing associated with the assignment model 528. Priority constraints are defined 700. Multiple priority constraints may be created based on confidence scores over a set of specified thresholds. The confidence score produced by model 526 is a measure of the confidence that a given line item textual entry is appropriately matched to an individual image object. Confidence score constraints with higher thresholds may have higher priority. This multistep confidence score threshold reduction approach combines advantages of a greedy and a global optimization algorithm. Another priority constraint may be an expense report type (e.g., a hotel receipt may be prioritized over a meal receipt). The attributes of an image may also be used to specify a priority constraint (e.g. a higher quality image is prioritized over a lower quality image). Other constraints may be a maximum number of times an image can be assigned to different lines (e.g., the number of assignments should not exceed the number of actual receipts detected in the image with module 512).

Pairs that meet the highest constraints are assigned to one another 702. If this initial constraint processing assigns all pairs (704—No), the assigned pairs are returned 710. Alternately, if there are still unassigned pairs (704—Yes), one or more high constraints is removed 706 and processing returns to block 702. This processing continues until all pairs are assigned (704—No) or no constrains remain (708—No).

Figure 8:
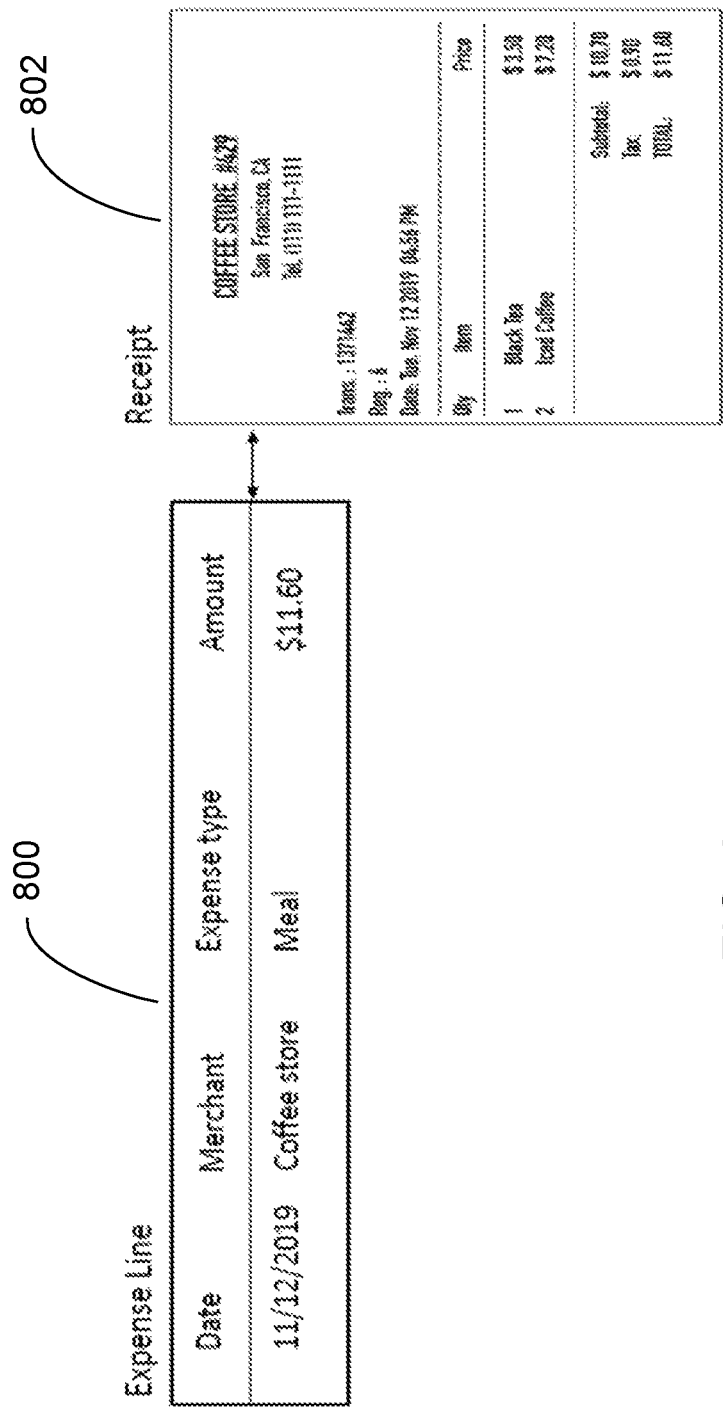
FIG. 8 illustrates a line item textual entry matched to an individual object in accordance with an embodiment of the invention.

FIG. 8 illustrates a line item textual entry 800 in a one-to-one match with an individual image object 802. In this example, it can be appreciated that the date extraction model 524 has identified a date, the merchant extraction model 518 has identified a merchant, the expense type classification model 520 has designated an expense type and the amount extraction model 522 has listed a transaction amount.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer implemented method, comprising:
receiving a document with line item textual entries and an attachment containing images of different objects characterizing different transactions;
splitting the images of the different objects into individual image objects;
extracting attributes from the individual image objects;
matching the line item textual entries with the individual image objects to form matched image objects, wherein the matched image objects include ambiguous matches with multiple individual image objects assigned to a single line item textual entry or a single individual image object assigned to multiple line item textual entries; and
applying assignment model matching to resolve the ambiguous matches, wherein the assignment module matching includes:
defining priority constraints,
assigning pairs of line item textual entries and individual image objects that meet highest priority constraints,
removing highest priority constraints when ambiguous matches remain,
repeating the assigning and removing operations until no ambiguous matches remain, and
returning one-to-one matches of line item textual entries and individual image objects.

2. The computer implemented method of claim 1 wherein splitting the images of the different objects into individual image objects utilizes a deep learning model trained on image objects where visual edges or boundaries are not present.

3. The computer implemented method of claim 1 wherein splitting the images of the different objects into individual image objects utilizes a deep learning model trained on different image objects with different spatial orientations.

4. The computer implemented method of claim 1 wherein splitting the images of the different objects into individual image objects transpires when an image object to background pixel contrast exceeds a specified threshold.

5. The computer implemented method of claim 1 further comprising grouping together travel itinerary individual image objects characterizing a single trip.

6. The computer implemented method of claim 1 wherein extracting includes itemizing different types of charges within a single image object.

7. The computer implemented method of claim 1 further comprising extracting merchant information from the individual image objects.

8. The computer implemented method of claim 1 further comprising assigning the individual image objects to expense type classifications.

9. The computer implemented method of claim 1 further comprising extracting transaction amount information from the individual image objects.

10. The computer implemented method of claim 1 further comprising extracting dates from the individual image objects.

11. The computer implemented method of claim 1 wherein the matched image objects include confidence scores, each confidence score characterizing the strength of a coupling between a line item textual entry and an individual image object.

* * * * *